United States Patent
Chien et al.

(10) Patent No.: US 9,595,383 B2
(45) Date of Patent: Mar. 14, 2017

(54) WIRELESS CHARGING COIL PCB STRUCTURE

(71) Applicant: TDK TAIWAN Corporation, Taipei (TW)

(72) Inventors: Feng-Lung Chien, Yangmei Taoyuan (TW); Takahiro Oishi, Yangmei Taoyuan (TW); Chris T Burket, Yangmei Taoyuan (TW); Chao-Neen Chang, Yangmei Taoyuan (TW); Alan Wu, Yangmei Taoyuan (TW)

(73) Assignee: TDK TAIWAN CORPORATION, Taipei (TW)

( * ) Notice: Subject to any disclaimer, the term of this patent is extended or adjusted under 35 U.S.C. 154(b) by 193 days.

(21) Appl. No.: 14/605,601

(22) Filed: Jan. 26, 2015

(65) Prior Publication Data
US 2016/0126009 A1    May 5, 2016

(30) Foreign Application Priority Data
Oct. 31, 2014  (TW) ............... 103137760 A (51) Int. Cl.
| | | |
|---|---|---|
| H01F 5/00 | (2006.01) | |
| H01F 27/28 | (2006.01) | |
| H01F 38/14 | (2006.01) | |
| H02J 5/00 | (2016.01) | |
| H02J 7/02 | (2016.01) | |
| H02J 7/00 | (2006.01) | |

(52) U.S. Cl.
CPC .............. *H01F 38/14* (2013.01); *H02J 5/005* (2013.01); *H02J 7/025* (2013.01); *H02J 50/10* (2016.02); *H02J 7/0042* (2013.01)

(58) Field of Classification Search
CPC .................................. H01F 5/00; H01F 27/28
USPC .................................................. 336/200, 232
See application file for complete search history.

(56) References Cited

U.S. PATENT DOCUMENTS

| | | | |
|---|---|---|---|
| 2003/0067377 A1* | 4/2003 | Fricker | ............... H01F 27/2804 336/232 |
| 2015/0054457 A1* | 2/2015 | Kim | ........................ H01F 38/14 320/108 |

* cited by examiner

*Primary Examiner* — Tsz Chan
(74) *Attorney, Agent, or Firm* — Muncy, Geissler, Olds & Lowe, P.C.

(57) ABSTRACT

A wireless charging coil PCB structure includes a first coil disposed on a first layer of PCB, where a center or peripheral of the first coil is a first non-coil region; a second coil disposed on a second layer of PCB, where a center or peripheral of the second coil is a second non-coil region; first conductive wires on the first non-coil region; and second conductive wires on the second non-coil region. Electric contacts are arranged between the first conductor and the second coil, and electrically connected in parallel to the first conductive wires and the portion of the second coil. Electric contacts are arranged between the second conductor and the first coil, and electrically connected in parallel to the second conductive wires and the portion of the first coil. The amount of charge is increased in the coil and resistance is reduced to overcome proximity effect.

9 Claims, 6 Drawing Sheets

WIRELESS CHARGING COIL PCB STRUCTURE

BACKGROUND OF THE INVENTION

Field of the Invention

The present invention relates to a wireless charging coil PCB structure, more particularly to a wireless charging coil PCB structure for overcoming the proximity effect between coils.

Description of the Prior Art

Figure 1:
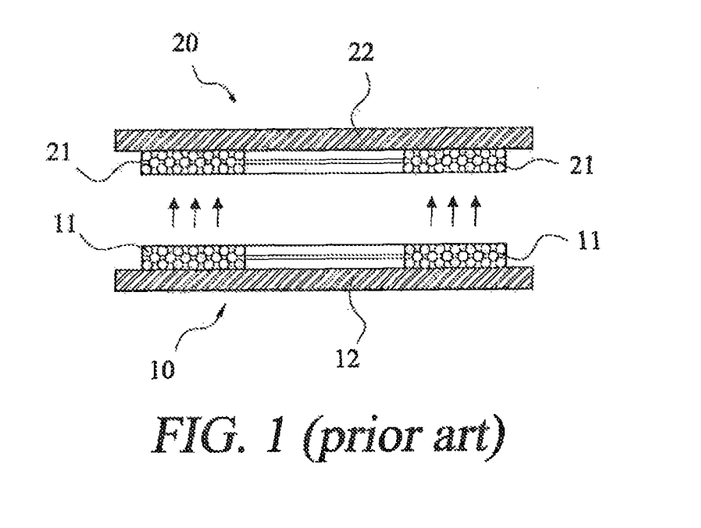
FIG. 1 is a schematic diagram showing the wireless charging scheme.

Wireless Charger (WLC) is a cordless power transmission technology using electromagnet induction. FIG. 1 is a schematic diagram showing the wireless charging scheme. The shown wireless charging scheme comprises a power transmitting module 10 and a power receiving module 20. The power transmitting module 10 comprises a transmitting-end coil 11 and a transmitting-end ferrite plate 12. The power receiving module 20 correspondingly comprises a receiving-end coil 21 and a receiving-end ferrite plate 22. When the power receiving module 20 is in proximity of the power transmitting module 10 and electrical current flows through the transmitting-end coil 11 to generate magnetic field, the receiving-end coil 21 of the power receiving module 20 will generate electrical current induced by the magnetic field.

The high end WLC module has plate with larger size at the power transmitting-end such that the power receiving module can be successfully charged as long as it is close to the plate of the power transmitting-end. Therefore, the power transmitting module will arrange lots set of coils to cover the desired charging range. For example, two sets of coils, or even three sets of coils may be arranged.

Figure 2:
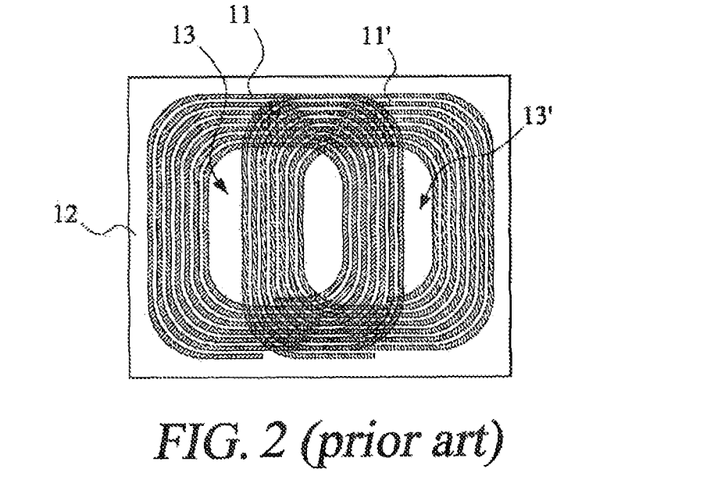
FIG. 2 shows the schematic view of a prior art inductor plate with two sets of coils.

The turn number and the coil inductance are related to the transmitting frequency of wireless charging and a non-coil region is formed at the center of the coil, therefore, another set of coil is generally arranged on the top of one set of coil. FIG. 2 shows the schematic view of a prior art inductor plate 12 with two sets of coils, where the coil 11 is arranged on top layer of the inductor plate 12 and another coil 11' is arranged on bottom layer of the inductor plate 12. Part of the coil 11 on top layer of the inductor plate 12 has a projection on the non-coil region 13' of the coil 11' on bottom layer; and part of the coil 11' on bottom layer of the inductor plate 12 has a projection on the non-coil region 13 of the coil 11 on top layer.

Figure 3:
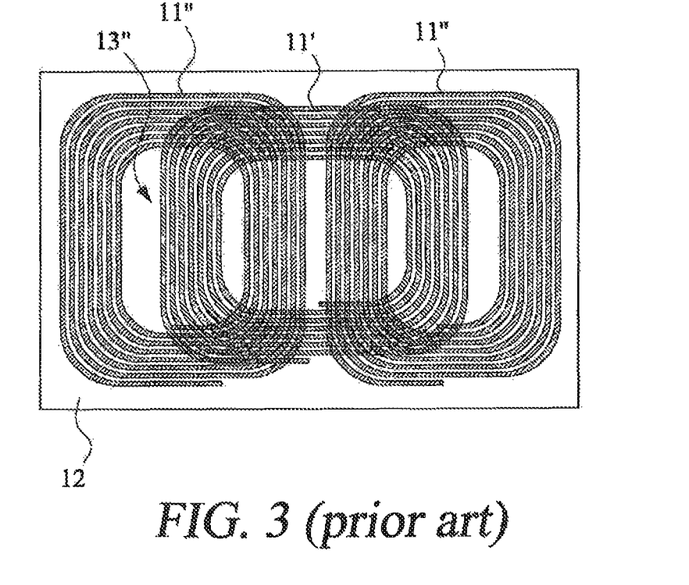
FIG. 3 shows the schematic view of another prior art inductor plate with three sets of coils.
Figure 4:
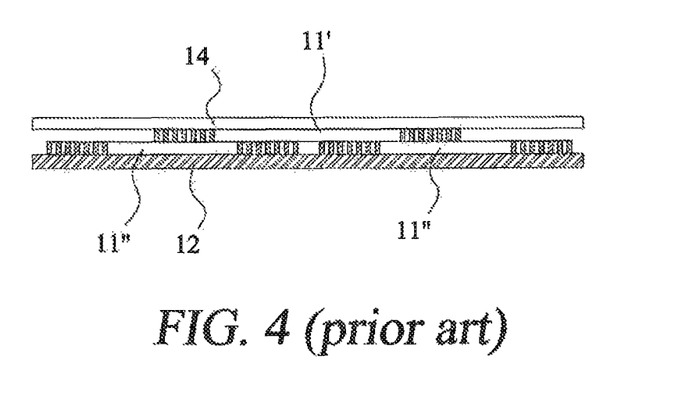
FIG. 4 shows the sectional view of the inductor plate in FIG. 3.

FIG. 3 shows the schematic view of another prior art inductor plate 12 with three sets of coils, and FIG. 4 shows the sectional view of the inductor plate 12 in FIG. 3. The three sets of coils are arranged in three overlapped rectangular manner. Namely, the coil 11' on top layer of the inductor plate 12 has a projection at the center between two other coils 11" on bottom layer of the inductor plate 12, and a part of the coil 11' on top layer of the inductor plate 12 has a projection on the non-coil region 13 of the other two coil 11" on bottom layer of the inductor plate 12. Similarly, more sets of coils such as four, five or even more sets of coils can be arranged in way similar to those shown in FIGS. 3 and 4, and the detailed description is omitted here for brevity.

In the inductor plate 12 shown in FIG. 4, the stacked coils are generally manufactured with multi-layer printed circuit board to reduce the overall height of the inductor plate 12. The inductor plate 12 for mounting the three coils 11', 11" is arranged on a ferrite plate 14 and is covered with a top plate, resulting in a WLC plate structure with at least four layers.

The high-end WLC module has higher demands for transmitting efficiency and heat dissipation ability; therefore, the coil impedance should be accordingly low for the PCB. However, the WLC module uses high frequency alternating current (AC) and the transmitting efficiency is related to the coil frequency and the matching of inductance. Coil impedance will increase and inductance will have fluctuation if proximity effect occurs between coils close to each other or between upper and lower stacked coils. Moreover, heat dissipation effect is also degraded. These are drawbacks to be overcome for high-end WLC module.

SUMMARY OF THE INVENTION

It is an object of the present invention to overcome the above-mentioned proximity effect in prior art WLC coil structure. Accordingly, the present invention provides a wireless charging coil PCB structure comprising: at least one first coil arranged on a first layer of a printed circuit board (PCB), the first layer having a first non-coil region on which the first coil is not arranged, the first non-coil region being on center or peripheral of the first coil; at least one second coil arranged on a second layer of the PCB, the second layer having a second non-coil region on which the second coil is not arranged, the second non-coil region being on center or peripheral of the second coil; and a plurality of first conductive wires arranged on the first non-coil region and corresponding to partial wires of the second coil, a plurality of electric contacts arranged between the first conductive wires and the partial wires of the second coil and passing from the first layer to the second layer, the electric contacts electrically connecting the first conductive wires and the partial wires of the second coil in parallel; and a plurality of second conductive wires arranged on the second non-coil region and corresponding to partial wires of the first coil, a plurality of electric contacts arranged between the second conductive wires and the partial wires of the first coil and passing from the first layer to the second layer, the electric contacts electrically connecting the second conductive wires and the partial wires of the first coil in parallel. Therefore, the charging amount of coil can be increased and impedance can be reduced. The problem of proximity effect can be overcome and the inductance (Ls) of coil can be adjusted, balanced or increased by changing the amount of conductive wires on the non-coil region.

According to one aspect of the present invention, the wireless charging coil PCB structure further comprises at least one third coil arranged on a third layer of the PCB, the third layer having a third non-coil region on which the third coil is not arranged, the third non-coil region being on center or peripheral of the third coil; partial wires of the third coil being corresponding to the second conductive wires, a plurality of electric contacts arranged between the second conductive wires and the partial wires of the second coil and passing from the second layer to the third layer, the electric contacts electrically connecting the second conductive wires and the partial wires of the second coil in parallel; and a plurality of third conductive wires arranged on the third non-coil region and corresponding to the partial wires of the second coil, a plurality of electric contacts arranged between the third conductive wires and the partial wires of the second coil and passing from the second layer to the third layer, the electric contacts electrically connecting the third conductive wires and the partial wires of the second coil in parallel.

According to another aspect of the present invention, the wireless charging coil PCB structure further comprises at least one fourth coil arranged on a fourth layer of the PCB, the fourth layer having a fourth non-coil region on which the fourth coil is not arranged, the fourth non-coil region being on center or peripheral of the fourth coil; partial wires of the fourth coil being corresponding to the third conductive wires, a plurality of electric contacts arranged between the third conductive wires and the partial wires of the fourth coil and passing from the third layer to the fourth layer, the electric contacts electrically connecting the third conductive wires and the partial wires of the fourth coil in parallel; and a plurality of fourth conductive wires arranged on the fourth non-coil region and corresponding to the partial wires of the third coil, a plurality of electric contacts arranged between the fourth conductive wires and the partial wires of the third coil and passing from the third layer to the fourth layer, the electric contacts electrically connecting the fourth conductive wires and the partial wires of the third coil in parallel.

According to still another aspect of the present invention, the electric contacts are arranged at both ends and/or a center of each one of the first conductive wires, the second conductive wires, the third conductive wires or the fourth conductive wires.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Hereinafter, the embodiments of the present invention will be described with reference to the associated drawings. It should be noted various exemplary embodiments shown in the figures are merely illustrative representations and are not necessarily the limit of the claim scope.

The present invention is intended to solve the problem of proximity effect occurring in PCB type coil of WLC module and reduce the coil impedance. The present invention can be applied to WLC module with varied number of coil and is not limited by following embodiments.

Figure 5A:
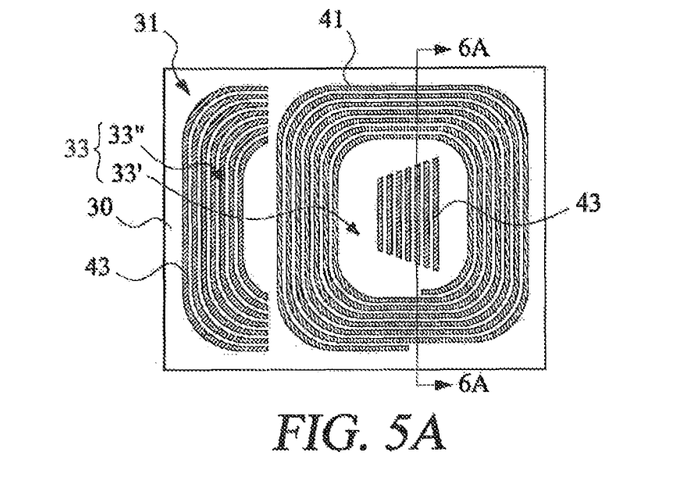
FIG. 5A shows the top view of the two-layered PCB structure with two coils according to an embodiment of the present invention.
Figure 5B:
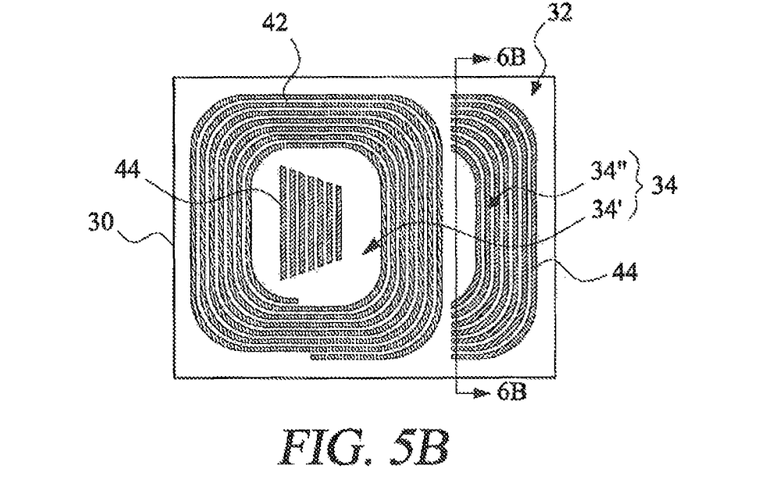
FIG. 5B shows the bottom view of the embodiment in FIG. 5A.

FIG. 5A shows the top view of the two-layered PCB structure with two coils according to an embodiment of the present invention. FIG. 5B shows the bottom view of the embodiment in FIG. 5A. The wireless charging coil PCB structure of the present invention comprises a PCB 30 having a top layer (face) 31 and a bottom layer (face) 32. At least one first coil 41 is arranged on the top layer 31 and winds into concentric circle. At least one second coil 42 is arranged on the bottom layer 32 and winds into concentric circle. The wireless charging coil PCB structure 30 of the present invention is arranged on a ferrite plate (not shown) to form induction board for wireless charging. In this embodiment, the first coil 41 and the second coil 42 can be wound into rectangular shape, circle shape, elliptic shape or polygonal shape. However, the winding shape and size of the coils can be varied according to practical need and can be adapted according to the shape and size of PCB. Therefore, the winding shape and size of the coils are not limited by shown embodiments.

In the embodiment shown in FIG. 5, the first coil 41 is arranged on the top layer 31 of the PCB 30, and the portion of the top layer 31 on which the first coil 41 is not arranged is a first non-coil region 33 not able to transmitting electric power. The first non-coil region 33 includes a center 33' of the first coil 41 and a peripheral 33" of the first coil 41, where the wires of the first winding coil 41 do not pass. Similarly, the second coil 42 is arranged on the bottom layer 32 of the PCB 30, and the portion of the bottom layer 32 on which the second coil 42 is not arranged is a second non-coil region 34 not able to transmitting electric power. The second non-coil region 34 includes a center 34' of the second coil 42 and a peripheral 34" of the second coil 42, where the wires of the second coil 42 do not pass. In this embodiment, the projection of the first coil 41 and the second coil 42 are cross with each other. In other word, the projection of the first coil 41 will pass the second non-coil region 34 (including the center 34' and peripheral 34" of the second coil 42), while the projection of the second coil 42 will pass the first non-coil region 33 (including the center 33' and peripheral 33" of the first coil 41). Therefore the wireless charging coil PCB structure of the present invention has effectively no or has minimized "non-coil region".

Figure 6A:
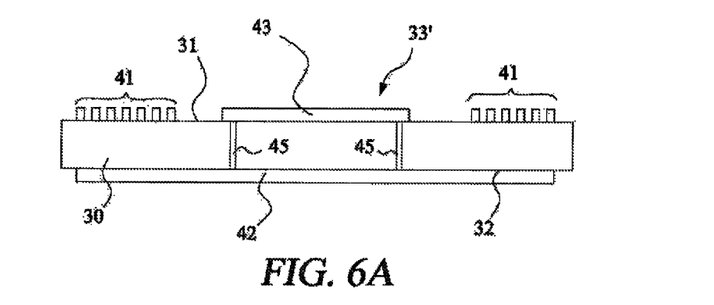
FIG. 6A is a sectional view along line 6A-6A passing through the center of the first coil 43 in FIG. 5A

As shown in FIGS. 5A and 5B, a plurality of first conductive wires 43 and second conductive wires 44 are arranged on the first non-coil region 33 on the first layer 31 and the second non-coil region 34 on the bottom layer 32, respectively. More particularly, the first conductive wires 43 are arranged on the first non-coil region 33 on the top layer 31, for example, on the center 33' of the first coil 41 or peripheral 33" of the first coil 41, and corresponding to partial wires of the second coil 42. Both end of the first conductive wire 43 or a center of the first conductive wire 43 or any portion(s) of the first conductive wire 43 have a plurality of electric contacts 45. The electric contacts 45 pass through the PCB to electrically connect to the corresponding wires of the second coil 42. With reference to FIG. 6A, which is a sectional view along line 6A-6A passing through the center 33' of the first coil 43 in FIG. 5A, each of the first conductive wires 43 has two electric contacts 45 at two ends thereof. The two electric contacts 45 are electrically connected to partial wires of the second coil 42 such that the first conductive wires 43 are in parallel connection with partial wires of the second coil 42.

Figure 6B:
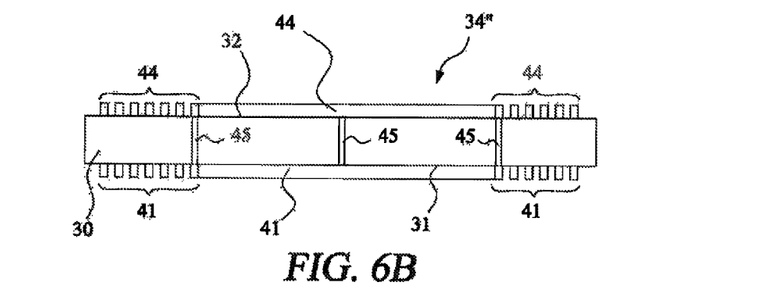
FIG. 6B is a sectional view along line 6B-6B passing through the peripheral of the second coil 44 in FIG. 5B

The second conductive wires 44 are arranged on the second non-coil region 34 on the bottom layer 32, for example, on the center 34' of the second coil 42 or peripheral 34" of the second coil 42, and corresponding to partial wires of the first coil 41. Both end of the second conductive wire 44 or a center of the second conductive wire 44 or any portion(s) of the second conductive wire 44 have a plurality of electric contacts 45. The electric contacts 45 pass through the PCB to electrically connect to the corresponding wire of the first coil 41. With reference to FIG. 6B, which is a sectional view along line 6B-6B passing through the peripheral 34" of the second coil 44 in FIG. 5B, each of the second conductive wires 44 has three electric contacts 45 at two ends and a center portion thereof. The three electric contacts 45 are electrically connected to partial wires of the first coil 41 such that the second conductive wires 44 are in parallel connection with partial wires of the first coil 41. Therefore, partial wires of the first coil 41 and partial wires of the second coil 42 can be electrically connected to the second conductive wire 44 and the first conductive wire 43, respectively. The charge transmission amount can be enhanced and the impedance of partial wires of the coils can be reduced, thus overcoming the proximity effect. The projection of coil on the non-coil region of the opposite layer also helps to balance the inductance of the coil or increase the inductance of the coil. Moreover, the inductance of the coil can also be adjusted by changing the number of coil projected to the non-coil region on opposite layer.

Figure 7A:
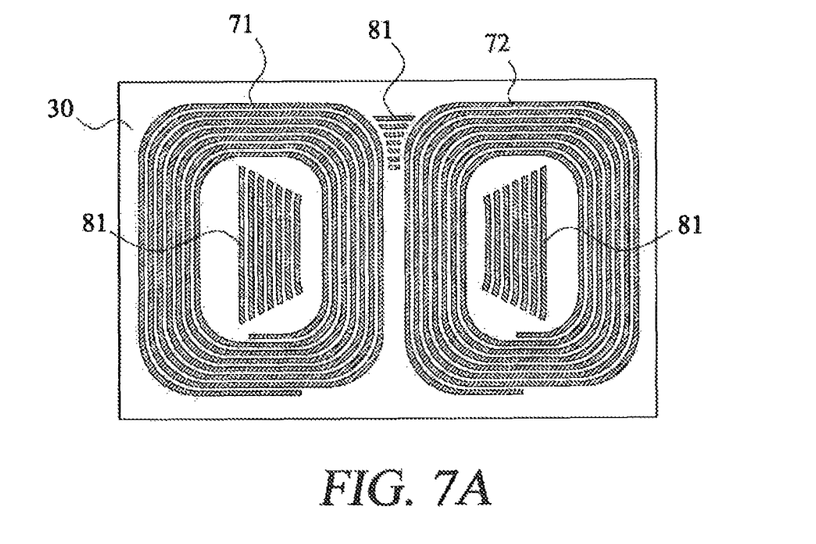
FIG. 7A shows the top view of the topmost portion of the multi-layer PCB structure with three sets of coil according to another embodiment of the present invention.
Figure 7B:
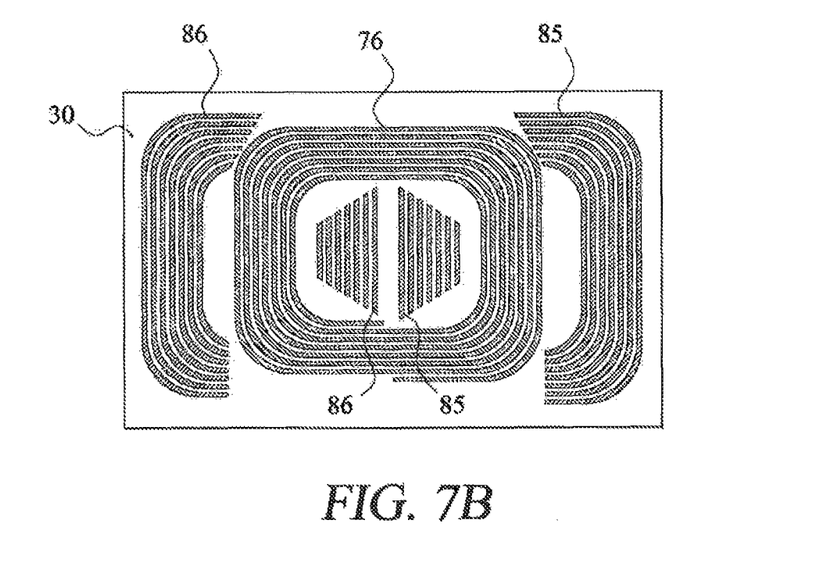
FIG. 7B shows the bottom view of the bottommost portion of the multi-layer PCB structure with three sets of coil according to another embodiment of the present invention.
Figure 8:
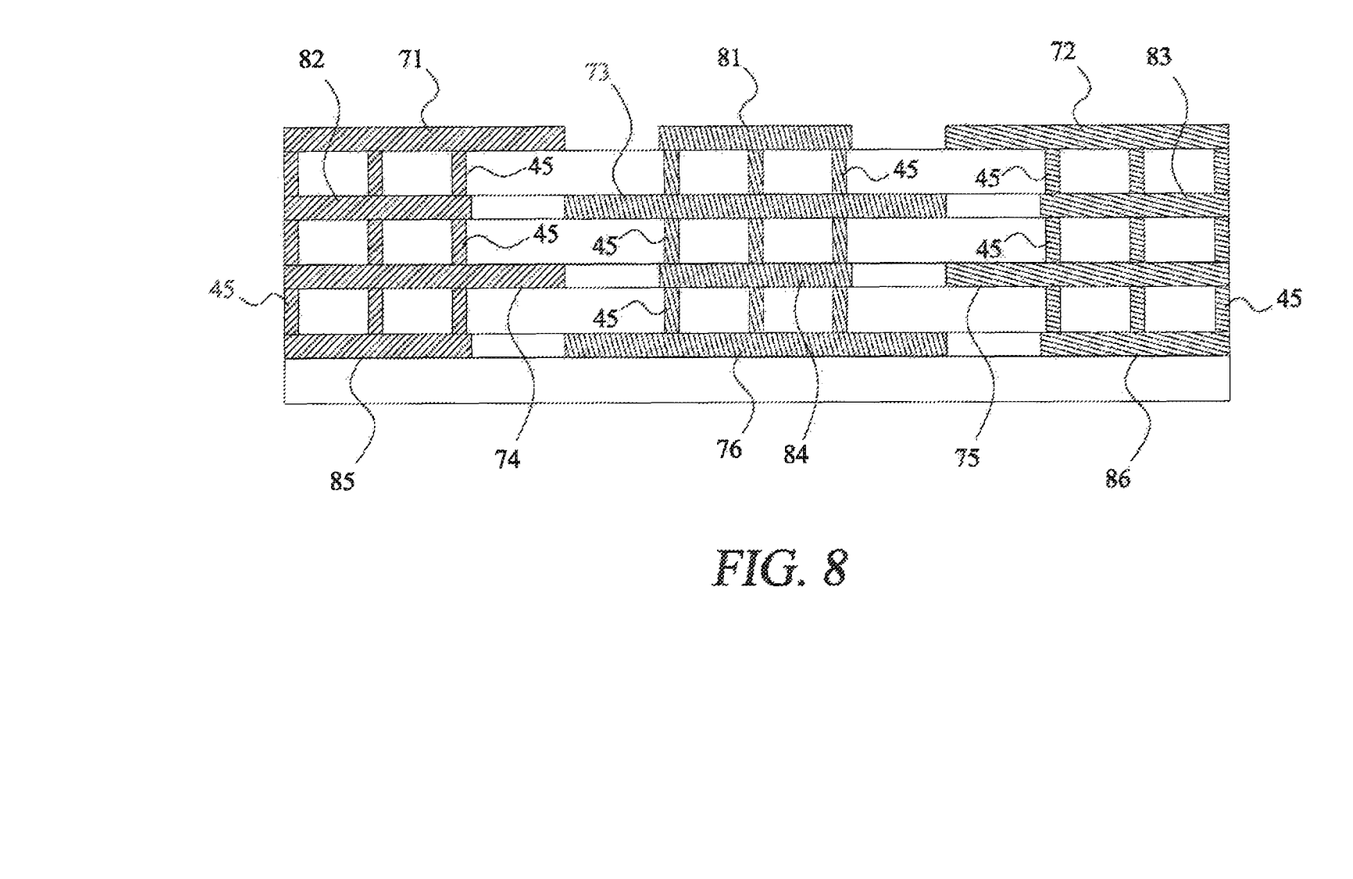
FIG. 8 shows a partial section view for the embodiment shown in FIGS. 7A and 7B.

The present invention can be further understood by an exemplary wireless charging coil PCB structure with three sets of coils. FIG. 7A shows the top view of the topmost portion of the multi-layer PCB structure with three sets of coil according to another embodiment of the present invention. FIG. 7B shows the bottom view of the bottommost portion of the multi-layer PCB structure with three sets of coil according to another embodiment of the present invention. FIG. 8 shows a partial section view for the embodiment shown in FIGS. 7A and 7B. In the shown embodiment, there are six coils respectively arranged on four layers of the PCB 30. More particularly, a first coil 71, a second coil 72 and first conductive wires 81 are arranged on the first layer (topmost layer) of the PCB 30, as shown in FIG. 7A. A third coil 73, second conductive wires 82 and third conductive wires 83 are arranged on the second layer of the PCB 30. A fourth coil 74, a fifth coil 75, and fourth conductive wires 84 are arranged on the third layer of the PCB. A sixth coil 76, fifth conductive wires 85 and sixth conductive wires 86 are arranged on the fourth layer (bottommost layer) of the PCB 30, as shown in FIG. 7B.

In the multi-layer PCB embodiment, the first conductive wires 81 on the first layer (topmost layer) of the PCB 30 are arranged on a non-coil region of the first coil 71 and the second coil 72, such as center or peripheral of the two coils 71 and 72 as shown in FIG. 7A and FIG. 8. The second conductive wires 82 and third conductive wires 83 on the second layer of the PCB 30 are arranged on a non-coil region of the third coil 73, such as center or peripheral of the third coil 73, as shown in FIG. 8. The fourth conductive wires 84 on the third layer of the PCB are arranged on non-coil regions of the fourth coil 74 and the fifth coil 75, such as centers or peripherals of the two coils 74 and 75 as shown in FIG. 8. The fifth conductive wires 85 and sixth conductive wires 86 on the fourth layer (bottommost layer) of the PCB 30 are arranged on a non-coil region of the sixth coil 76, such as center or peripheral of the sixth coil 76, as shown in FIG. 7B and FIG. 8.

A plurality of electric contacts 45 are arranged between partial wires of the first coil 71 on the first layer of PCB 30 and the second conductive wires 82 on the second layer of PCB 30, and the electric contacts 45 pass from the first layer to the second layer. Therefore, partial wires of the first coil 71 are electrically connected to the second conductive wires 82 in parallel. A plurality of electric contacts 45 are arranged between the second conductive wires 82 and partial wires of the fourth coil 74 on the third layer and the electric contacts 45 pass from the second layer to the third layer. Therefore, partial wires of the fourth coil 74 are electrically connected to the second conductive wires 82 in parallel. A plurality of electric contacts 45 are arranged between the partial wires of the coil 74 on the third layer of PCB 30 and the fifth conductive wires 85 on the fourth layer of the PCB 30 and the electric contacts 45 passes from the third layer to the fourth layer. The partial wires of the fourth coil 74 are electrically connected to the fifth conductive wires 85 in parallel. In this manner, the first coil 71 is in parallel electrical connection with the fourth coil 74.

Similarly, a plurality of electric contacts 45 are arranged between partial wires of the second coil 72 on the first layer of PCB 30 and the third conductive wires 83 on the second layer of PCB 30, and the electric contacts 45 pass from the first layer to the second layer. Therefore, partial wires of the second coil 72 are electrically connected to the third conductive wires 83 in parallel. A plurality of electric contacts 45 are arranged between the third conductive wires 83 and partial wires of the fifth coil 75 on the third layer and the electric contacts 45 pass from the second layer to the third layer. Therefore, partial wires of the fifth coil 74 are electrically connected to the second third wires 83 in parallel. A plurality of electric contacts 45 are arranged between the partial wires of the fifth coil 74 on the third layer of PCB 30 and the sixth conductive wires 86 on the fourth layer of the PCB 30 and the electric contacts 45 passes from the third layer to the fourth layer. The partial wires of the fifth coil 75 are electrically connected to the sixth conductive wires 86 in parallel. In this manner, the second coil 72 is in parallel electrical connection with the fifth coil 75.

Moreover, a plurality of electric contacts 45 are arranged between the first conductive wires 81 on the first layer of the PCB 30 and partial wires of the third coil 73 on the first layer of PCB 30, and the electric contacts 45 pass from the first layer to the second layer. Therefore, partial wires of the third coil 73 are electrically connected to the first conductive wires 81 in parallel. A plurality of electric contacts 45 are arranged between the partial wires of the third coil 73 on the second layer of the PCB 30 and the fourth conductive wires 84 on the third layer of the PCB 30, and the electric contacts 45 pass from the second layer to the third layer. Therefore, partial wires of the third coil 73 are electrically connected to the fourth wires 84 on the third layer in parallel. A plurality of electric contacts 45 are arranged between the partial wires of the sixth coil 76 on the fourth layer of PCB 30 and the fourth conductive wires 84 on the third layer of the PCB 30 and the electric contacts 45 passes from the third layer to the fourth layer. The partial wires of the sixth coil 76 are electrically connected to the fourth conductive wires 84 in parallel. In this manner, the third coil 73 is in parallel electrical connection with the sixth coil 76.

As can be seen from above embodiment, the six separately coils are in effect "three coils" by parallel connecting each two coils on different layers by conductive wires, whereby the charging amount of the coil can be increased and the impedance of the coil can be reduced, thus overcoming the proximity effect between coils. In the embodiment of the present invention, there are two intact coils on the topmost layer of the PCB 30 and the coil on the bottommost layer of the PCB is also electrically connected to the conductive wires on the topmost layer of the PCB 30, where the conductive wires on the topmost layer of the PCB 30 are arranged on the non-coil region of the topmost layer. Therefore, the wireless charging coil PCB structure of the present invention minimize the effect of non-coil region and the area of the non-coil region effectively approaches to zero. Most of the coils are arranged on the topmost layer and approach the receiving end of the WLC scheme, thus enhancing power transmission efficiency. Moreover, the concept of the present invention can be applied to wireless charging coil PCB structure with larger PCB having more coils such as four or five coil. The PCB structure can comprise layer number more than four, such as six-layers PCB, eight-layers PCB and so on. Therefore, the number and arrangement of coils can be varied, which is still within the scope of the present invention.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A wireless charging coil PCB structure, comprising:
   at least one first coil arranged on a first layer of a printed circuit board (PCB), the first layer having a first non-coil region on which the first coil is not arranged, the first non-coil region being on center or peripheral of the first coil;
   at least one second coil arranged on a second layer of the PCB, the second layer having a second non-coil region on which the second coil is not arranged, the second non-coil region being on center or peripheral of the second coil;
   a plurality of first conductive wires arranged on the first non-coil region and corresponding to partial wires of the second coil, a plurality of electric contacts arranged between the first conductive wires and the partial wires of the second coil and passing from the first layer to the second layer, the electric contacts electrically connecting the first conductive wires and the partial wires of the second coil in parallel;
   a plurality of second conductive wires arranged on the second non-coil region and corresponding to partial wires of the first coil, a plurality of electric contacts arranged between the second conductive wires and the partial wires of the first coil and passing from the first layer to the second layer, the electric contacts electrically connecting the second conductive wires and the partial wires of the first coil in parallel;
   at least one third coil arranged on a third layer of the PCB, the third layer having a third non-coil region on which the third coil is not arranged, the third non-coil region being on center or peripheral of the third coil; partial wires of the third coil being corresponding to the second conductive wires, a plurality of electric contacts arranged between the second conductive wires and the partial wires of the third coil and passing from the second layer to the third layer, the electric contacts electrically connecting the second conductive wires and the partial wires of the second coil in parallel; and
   a plurality of third conductive wires arranged on the third non-coil region and corresponding to the partial wires of the second coil, a plurality of electric contacts arranged between the third conductive wires and the partial wires of the second coil and passing from the second layer to the third layer, the electric contacts electrically connecting the third conductive wires and the partial wires of the second coil in parallel.

2. The wireless charging coil PCB structure in claim 1, wherein the first layer of the PCB is a topmost layer of the PCB, and the second layer is the bottommost layer of the PCB.

3. The wireless charging coil PCB structure in claim 1, further comprising:
   at least one fourth coil arranged on a fourth layer of the PCB, the fourth layer having a fourth non-coil region on which the fourth coil is not arranged, the fourth non-coil region being on center or peripheral of the fourth coil; partial wires of the fourth coil being corresponding to the third conductive wires, a plurality of electric contacts arranged between the third conductive wires and the partial wires of the fourth coil and passing from the third layer to the fourth layer, the electric contacts electrically connecting the third conductive wires and the partial wires of the fourth coil in parallel; and
   a plurality of fourth conductive wires arranged on the fourth non-coil region and corresponding to the partial wires of the third coil, a plurality of electric contacts arranged between the fourth conductive wires and the partial wires of the third coil and passing from the third layer to the fourth layer, the electric contacts electrically connecting the fourth conductive wires and the partial wires of the third coil in parallel.

4. The wireless charging coil PCB structure in claim 3, wherein the first layer of the PCB is a topmost layer of the PCB, the second layer and the third layer are inter layers of the PCB and the fourth layer is the bottommost layer of the PCB.

5. The wireless charging coil PCB structure in claim 3, wherein the electric contacts are arranged at both ends of each one of the first conductive wires, the second conductive wires, the third conductive wires or the fourth conductive wires.

6. The wireless charging coil PCB structure in claim 3, wherein the electric contacts are arranged at a center of each one of the first conductive wires, the second conductive wires, the third conductive wires or the fourth conductive wires.

7. The wireless charging coil PCB structure in claim 3, wherein the first coil, the second coil, the third coil or the fourth coil has a winding shape of rectangular shape, circular shape, elliptical shape, or polygonal shape.

8. The wireless charging coil PCB structure in claim 3, wherein the first coil, the second coil, the third coil and the fourth coil have different shapes and sizes.

9. The wireless charging coil PCB structure in claim 3, wherein the PCB is arranged on a ferrite plate.

* * * * *